Sept. 12, 1967

T. H. HONTZ 3,340,602

PROCESS FOR SEALING

Filed Feb. 1, 1965

INVENTOR.
THOMAS H. HONTZ

BY

Harry W. Hargis III
AGENT 3,340,602
PROCESS FOR SEALING
Thomas H. Hontz, Cedars, Pa., assignor to Philco Ford Corporation, a corporation of Delaware
Filed Feb. 1, 1965, Ser. No. 429,471
12 Claims. (Cl. 29—588)

This invention relates to a process for sealing, and more particularly to improvements in the sealing of semi-conductive devices. While of broader applicability, the principles of the invention have particularly utility in the hermetic sealing of housings for silicon micro-electronic circuit devices.

Several known types of micro-electronic circuit devices are housed within relatively flat containers comprising gold plated hollow portions closed by gold plated caps. In the assembly of such devices the housing is hermetically sealed by soldering the cap to a suitably presented rim section of the hollow portion. Heretofore, this seal has been made using a gold-germanium alloy solder. It has been found, however, that heating such devices to temperatures required to melt the solder in achievement of a reliable seal adversely affects certain micro-electronic circuit elements. Particularly adversely affected are silicon circuit elements that include gold-to-aluminum bonded connections since sealing temperatures required for gold-germanium alloy solder in the making of such connections are in the range from about 356° C. to about 525° C. At such temperatures, the gold-to-aluminum circuit connections tend to fail due to formation of a brittle gold-aluminum phase. At lower sealing temperatures, at which no degradation occurs, seals have been found to be unreliable.

It is therefore a general objective of this invention to provide a novel method of assembly that achieves improved hermetic seals at soldering temperatures that do not degrade micro-electronic circuits of the aforementioned type.

In achievement of the foregoing as well as other objectives, the invention contemplates, in preferred practice thereof, the use of a gold-tin alloy soldier, preferably 20% tin by weight, to solder bond a gold plated cap to a gold plated housing within which there is disposed a silicon semi-conductive device comprising gold-to-aluminum solder connections. Prior to soldering, the caps and housings are subjected to a hydrogen environment for a predetermined period at non-deleterious elevated temperatures. The caps and housings, with preformed rings or strips of the solder in place, are then subjected to a nitrogen environment, at substantially the same temperatures as maintained in the hydrogen environment, to melt the solder and form the seals between the caps and the housings.

The manner in which the foregoing as well as other objectives may best be achieved will be more fully understood from a consideration of the following description, taken in light of the accompanying drawing in which.

Figure 1:
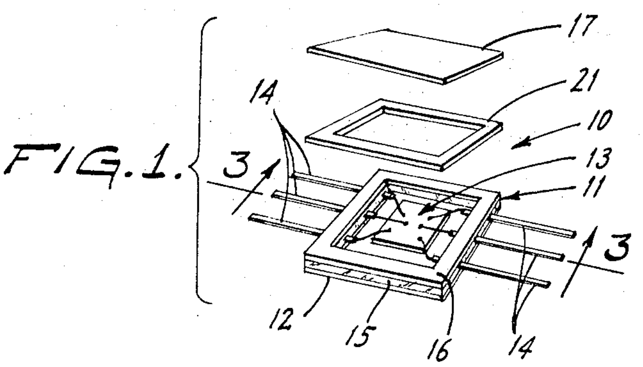
FIGURE 1 is an exploded view of elements of a microelectronic circuit device of a type adapted for assembly in accordance with the present invention.
Figure 3:
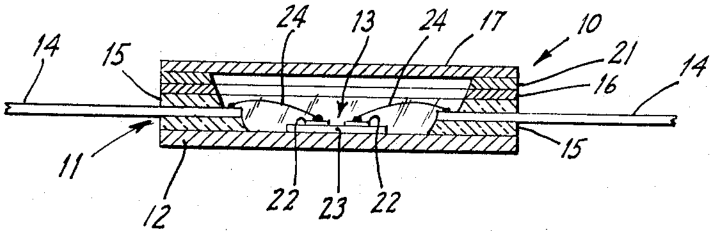
FIGURE 3 is a sectional view of an assembled device, as seen looking generally in the direction of arrows 3—3 applied to FIGURE 1.

With more particular reference to the drawing, and first to FIGURES 1 and 3, a micro-electronic circuit device 10 of a type especially adapted for assembly in accordance with the invention comprises a housing 11 provided with a base portion 12, advantageously of Kovar, having a silicon micro-electronic circuit device 13 supported thereon. Leads 14 preferably of gold plated Kovar extend through and outwardly from opposed lateral wall portions 15 of the housing, which wall portions comprise a ring shaped lamina of glass that both electrically insulates the leads and supports them upon the base. "Kovar" is the trade name for an iron-nickel-cobalt alloy having thermal expansion and contraction characteristics closely matching those of the glass. It is to be understood that other similar materials may be used. For example, base portion 12 may be of glass and formed integrally with or separate from the glass wall portions 15. A gold plated, flat Kovar ring 16 is sealed to the upper surface of glass walls 15, and forms the upper surface of housing 11 to which a gold plated Kovar cap 17 is solder bonded by means of a preformed ring shaped body of solder 21. In particular accordance with principles of this invention, solder ring 21 comprises an alloy of gold and tin (20% by weight) having a melting point of about 280° C. Preferably, the ring is flat, being about 2 mils thick in the embodiment under consideration, and has substantially the same dimensions as the Kovar ring 16 formed on the housing, which is about .38 inch long, .25 inch wide, and .05 inch high.

The micro-electronic circuit device 13 comprises aluminum circuit elements 22 (FIGURE 3) adherent to and extending over upwardly facing surface portions of a silicon wafer 23 bonded to base portion 12 of the housing. Whisker wires 24, preferably of gold, extend between terminal portions of aluminum circuit contact elements 22 and suitably presented inner ends of leads 14. Electrical connection of whisker wires 24 to leads 14 and to aluminum contact elements 22 is effected in known manner by means of a thermal compression bond. This invention is particularly directed to the protection of the gold-to-aluminum contact bond, during the process of hermetically sealing the cap to the housing.

As discussed previously, gold-to-aluminum bonded silicon devices heretofore have presented problems due to the formation of an intermetallic phase, such, for example, as $AuAl_2$ (known in the trade as "purple plague"), due to heating of the devices to the relatively high temperatures required to flow the gold-germanium alloy solder.

Remarkably improved bonds have been achieved, both in the hermetic seals and in the wire connections, as a result of practicing the invention.

Prior to the hermetic sealing soldering operation, the gold-20% tin preformed solder rings 21 are immersed in a 1:1 solution of hydrochloric acid in deionized water. After a predetermined short period of time this solution is poured off, and the rings are rinsed with deionized water for several minutes. Rings 21 thereafter are removed from the water, rinsed thoroughly in methyl alcohol, and blown dry with nitrogen. The solder rings then are ready for use, and, if they are not to be used immediately, preferably are stored in an ambient atmosphere of nitrogen for a period that should not exceed 48 hours before use.

Figure 4:
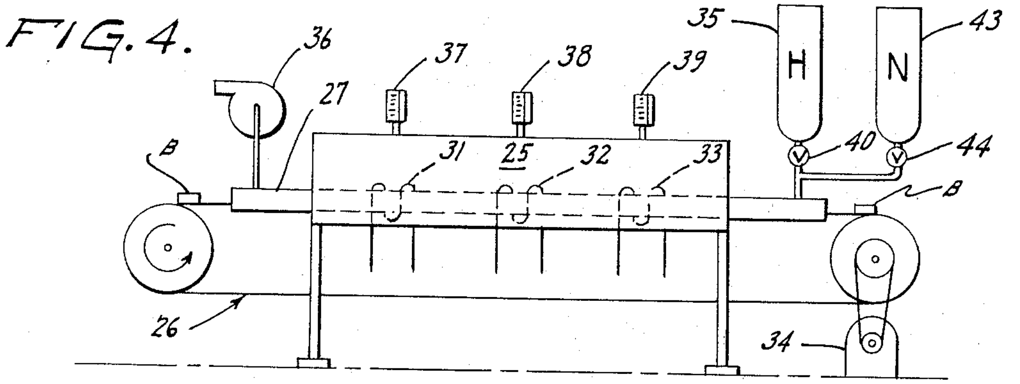
FIGURE 4 is a somewhat diagrammatic showing of apparatus utilized both in the initial and in the final stages of assembly of the device.

In achievement of the hydrogen firing step, and still prior to the hermetic sealing operation, caps 17 and housings 11, with circuit devices mounted therein, are placed separately in carbon boats represented diagrammatically at B in FIGURE 4. The boats B may be placed upon an endless conveyor belt 26 that passes through the muffle 27 of a furnace 25 illustrated diagrammatically in FIGURE 4. Muffle 27 is heated at longitudinally spaced portions thereof by means of radiant heating coils, three of which are shown by way of example at 31, 32, and 33, disposed about the periphery of the muffle. The heating coils are connected to known suitable sources of energy (not shown), and are adjustably energized at predetermined heat values to achieve, in combination with movement of belt 26 at a predetermined speed, the preferred time-temperature relationship for the parts being either soldered or pre-fired. This preferred relationship is illustrated diagrammatically in FIGURE 5, and will be discussed in detail later. Heat values required to obtain the desired boat temperatures conveniently may be determined experimentally, and in a prior operation, by affixing a thermocouple to a carbon boat and driving it through furnace muffle 27 by conveyor belt 26 while adjusting the heater energization. The desired belt speed is selected also at this time by adjusting a known suitable drive means designated generally by the numeral 34.

While the caps and housing are driven through the furnace in achievement of the pre-firing step, hydrogen is introduced to muffle 27 by opening the valve 40 to place hydrogen supply means 35 in fluid flow communication with one end of the the muffle. Uniform flow of hydrogen through the muffle is ensured by a blower 36 energized by known suitable means and having its inlet port in fluid flow communication with other end of the muffle. The hydrogen flow rate is so selected as to achieve substantially uniform hydrogen bathing of exposed surfaces of the housings and caps while the illustrated preferred time-temperature relationships are maintained in the region of the elements undergoing treatment. The temperatures of the various muffle zones are indicated by known suitable sensing and indicating means, designated generally by numerals 37, 38 and 39, and disposed at spaced intervals along the length of furnace 25. In the preferred temperature time program (FIGURE 5) for carrying out the invention, the temperature scale designates the cap and housing temperatures per se, and these temperatures upon which the curve is based are not necessarily identical with the temperatures indicated by the sensing and indicating means 37, 38 and 39. Nevertheless, proper control of the temperatures at 37–39 will result in maintenance of the desired soldering temperatures.

Figure 5:
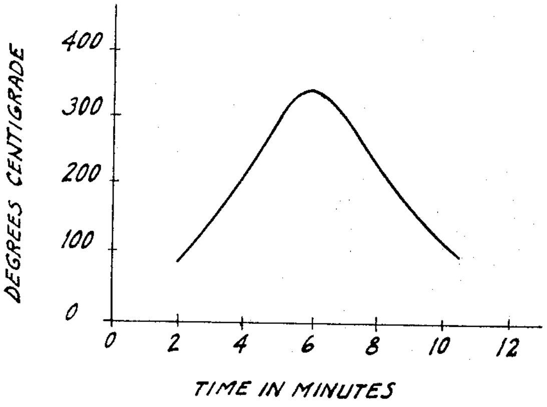
FIGURE 5 is a time-temperature chart illustrating a preferred heating program for carrying out the invention.

With further and more detailed reference to FIGURE 5, a preferred cap and housing temperature-time curve provided by the furnace for both the hydrogen firing and the soldering operations is substantially symmetric. The cooling portion of the curve essentially is a mirror image of the heating portion in the interest of minimizing the time spent in each of these operations. It will be appreciated from the curve in FIGURE 5 that the caps and housings are preferably in the heated zones for a total of about 8 minutes, being maintained at about 340° C. for a period of about 50 seconds and above 280° C. for a period of about 2½ to 3 minutes, in a generally Gaussian shaped furnace temperature "profile." At least in the soldering operation it is preferred that the initial heating rate of the device housing should exceed 30° C. per minute. It is important that this heating rate be controlled since it has been found that oxidation detrimental to formation of the seal occurs at lower heating rates. The 2½ to 3 minute period above 280° C. insures satisfactory flow of the solder. The peak temperature may vary between 325° C. and 340° C. for the 50 second interval. However, it is recommended that the time interval for this higher temperature range be held to a minimum in order to avoid formation of "purple plague."

Figure 2:
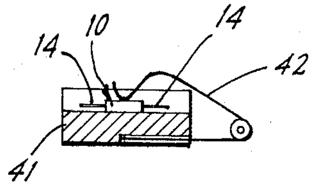
FIGURE 2 is a generalized view of a partially assembled device, and a portion of the apparatus utilized in completing the assembly.

After completing the above described hydrogen firing step, each of the housings, the preformed solder rings and the caps are assembled in the order shown in FIGURE 1, and placed in carbon firing jigs 41 (FIGURE 2) including spring actuated means 42 that resiliently press the parts together, preferably with a force of about 50 grams. This step in the assembly preferably, but not necessarily, is performed while the parts are subjected to a dry nitrogen ambient atmosphere to minimize contamination. Firing jigs 41 are then placed on the furnace conveyor belt 26, in the same locations as boats B, and driven through the furnace muffle in the presence of nitrogen, while subjected to the hereinabove described temperature profile as is illustrated in FIGURE 5. Nitrogen flow through the muffle is obtained by opening valve 44 to permit its flow from supply tank 43, hydrogen supply valve 40 being closed at this time. When the parts have become sufficiently heated, the solder ring is melted, and a small amount of gold plating is dissolved by the molten solder alloy. This dissolution of gold into the solder raises its melting temperature, with the advantageous result that the hermetric seal, obtained upon solidification of the solder, can be maintained at environmental temperatures as high as about 300° C.

Sealed devices made in accordance with the invention have exhibited unusually low leakage rates as well as a high degree of freedom from "purple plague." By way comparison, devices heretofore produced have been found to have helium leakage rates of about $1\times10^{-6}$ cc./sec., whereas 95% of a production run of devices sealed in accordance with principles of the invention advantageously had lower helium leakage rates of $1\times10^{-8}$ cc./sec.

From the foregoing description it will be appreciated that the invention affords a simple and effective means for achieving an improved hermetic seal, without risk of damage to the encapsulated circuit elements.

I claim:

1. A process for hermetically sealing a gold plated cap to a gold plated housing for a semiconductive device including gold-to-aluminum electrical connections, comprising the steps of: subjecting the cap and housing to a hydrogen-rich atmosphere while heating said cap and housing to a temperature in the region of at least 325° C. to 340° C.; cooling said cap and housing; interposing a body of solder comprising an alloy of about 20% tin with gold between said cap and said housing; subjecting the cap, the housing, and the body of solder thus assembled to a nitrogen-rich atmosphere while heating the recited assembly to a temperature of in the region of at least 325° C. to 340° C. for a period of time sufficient to melt the solder and dissolve adjacent portions of the gold plating; and permitting the solder to solidify.

2. A process according to claim 1, and further characterized in that said semiconductive device comprises a body of silicon having aluminum contacts disposed thereon, and gold lead wire elements affixed to said contacts.

3. A process according to claim 1, and further characterized in that the elements undergoing solder bonding are heated and cooled in each said ambient atmosphere at substantially the same rates.

4. A process according to claim 1, and further characterized in that a 50 gram force is exerted against said cap to hold it engaged with said body of solder.

5. A process according to claim 1, and further including the step of pickling the body of solder in a bath comprising a one-to-one solution of hydrochloric acid in deionized water, prior to the recited assembly of the body of solder, the cap, and the housing.

6. A process according to claim 1, and further characterized in that the elements undergoing solder bonding are heated at a rate not less than 30° C. per minute.

7. A process according to claim 6, and further characterized in that the temperatures of the elements undergoing solder bonding are maintained above 280° C. for a period of about 3 minutes and in the region of at least 325° C. to 340° C. for about 50 seconds.

8. In a process for hermetically sealing electrical circuit means, including gold-to-aluminum bonded connections, in a housing having a sealing surface of gold, by solder bonding thereto a cap having a mating sealing surface of gold, the steps comprising: heating said cap and housing, in the presence of hydrogen, to a temperature sufficient to render the sealing surfaces receptive to solder bonding without adversely heating the circuit means; cooling said cap and housing; interposing a body of solder comprising a gold-tin alloy between said cap and housing sealing surfaces; subjecting the cap, the housing, and the solder thus assembled to an ambient atmosphere of nitrogen while heating the recited assembly to a temperature sufficient to melt the solder and dissolve adjacent portions of the gold sealing surface without adversely heating the circuit means and housing; and permitting the solder to solidify.

9. A process according to claim 8, and further characterized in that the heating and cooling rates are substantially the same in each of the recited hydrogen and nitrogen ambient atmospheres.

10. A process according to claim 8, and further characterized in that the cap is forcibly held against the body of solder and the housing while the body of solder is melted to form the solder bond.

11. A process according to claim 8, and further characterized in that the elements undergoing solder bonding are heated at a rate not less than 30° C. per minute.

12. A process according to claim 11 and further characterized in that the temperatures of the elements undergoing solder bonding are maintained above 280° C. for a period of about 3 minutes and in the region of at least 325° C. to 340° C. for about 50 seconds.

References Cited

UNITED STATES PATENTS

| | | | |
|---|---|---|---|
| 3,072,832 | 1/1963 | Kilby. | |
| 3,150,013 | 9/1964 | Stanton | 29—504 X |
| 3,158,471 | 11/1964 | Kadelburg | 29—504 X |
| 3,202,489 | 8/1965 | Bender | 29—501 X |
| 3,209,450 | 10/1965 | Klein | 29—501 X |
| 3,271,625 | 9/1966 | Caracciolo. | |

JOHN F. CAMPBELL, *Primary Examiner*.

R. F. DROPKIN, *Assistant Examiner*.